US012659278B2

(12) United States Patent
Brinckman et al.

(10) Patent No.: US 12,659,278 B2
(45) Date of Patent: Jun. 16, 2026

(54) FILTERING BROADCAST PACKETS IN DISTRIBUTED COMMUNICATION SYSTEMS

(71) Applicant: Cisco Technology, Inc., San Jose, CA (US)

(72) Inventors: Bart Brinckman, Holsbeek (BE); Muhammad Shahzad, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 43 days.

(21) Appl. No.: 18/677,759

(22) Filed: May 29, 2024

(65) Prior Publication Data

US 2025/0097157 A1 Mar. 20, 2025

Related U.S. Application Data

(60) Provisional application No. 63/582,730, filed on Sep. 14, 2023.

(51) Int. Cl.
H04L 47/24 (2022.01)
H04L 47/32 (2022.01)

(52) U.S. Cl.
CPC .............. H04L 47/24 (2013.01); H04L 47/32 (2013.01)

(58) Field of Classification Search
CPC ................................ H04L 47/24; H04L 47/32
See application file for complete search history.

(56) References Cited

U.S. PATENT DOCUMENTS

| | | | |
|---|---|---|---|
| 8,477,693 B1 * | 7/2013 | Knoop | H04M 3/4878 |
| | | | 370/465 |
| 11,778,540 B1 | 10/2023 | Zanski et al. | |
| 2010/0036737 A1 | 2/2010 | Shenfield et al. | |
| 2010/0082439 A9 | 4/2010 | Patel et al. | |
| 2010/0299702 A1 | 11/2010 | Lo et al. | |
| 2010/0322236 A1 * | 12/2010 | Vimpari | G06F 16/174 |
| | | | 370/389 |

(Continued)

OTHER PUBLICATIONS

Stratos Isreos et al, Query Processing in Super-Peer Networks with Languages Based on Information Retrieval: the P2P-DIET Approach.

*Primary Examiner* — Farzana B Huq
(74) *Attorney, Agent, or Firm* — Rutan & Tucker, LLP; Ravi Mohan; Marc McClain

(57) ABSTRACT
Devices, systems, methods, and processes for filtering of received broadcast packets at access points (APs) connected to a controller. Typically, the APs forward all the received broadcast packets to the controller for processing. Many of these broadcast packets may not be subscribed by any application and thus are dropped by the controller. Thus, both the APs and the controller resources are being wasted in processing the broadcast packets that may eventually be dropped. The controller, therefore, generates a filtering rule-set to drop one or more broadcast packets from the received broadcast packets based on one or more subscriptions from applications. The controller may install the filtering ruleset on the APs, so that only the broadcast packets subscribed by the applications are received by the controller. Further, the controller may run periodic updates on the filtering ruleset to accommodate any new subscriptions, new allow rule or drop rule from the applications.

18 Claims, 9 Drawing Sheets

(56) References Cited

U.S. PATENT DOCUMENTS

| | | | | |
|---|---|---|---|---|
| 2011/0010267 | A1* | 1/2011 | Devries | G06Q 30/0607 |
| | | | | 705/26.25 |
| 2012/0135723 | A1* | 5/2012 | Ramo | H04W 4/06 |
| | | | | 455/418 |
| 2015/0082378 | A1* | 3/2015 | Collison | H04L 63/20 |
| | | | | 726/1 |
| 2018/0295101 | A1 | 10/2018 | Gehrmann | |

* cited by examiner

502

500

506     508A     5048B     508C     504

510A     510B     510C

512

514

700

RECEIVE ONE OR MORE SUBSCRIPTION TOPICS — 710

EVALUATE A FIRST SET OF BROADCAST PACKETS AND A SECOND SET OF BROADCAST PACKETS — 720

GENERATE A FILTERING RULESET — 730

TRANSMIT THE FILTERING RULESET — 740

RUN A PERIODIC UPDATE — 750

GENERATE A NEW FILTERING RULESET — 760

IS NEW FILTERING RULESET SAME AS PREVIOUS FILTERING RULESET ? — 765

YES

NO

TRANSMIT THE NEW FILTERING RULESET — 770

*800*

FILTERING BROADCAST PACKETS IN DISTRIBUTED COMMUNICATION SYSTEMS

This application claims the benefit of U.S. Provisional Patent Application No. 63/582,730, filed Sep. 14, 2023, which is incorporated by reference herein in its entirety.

The present disclosure relates to wireless networking. More particularly, the present disclosure relates to deriving one or more filter rules to filter unwanted broadcast packets and/or messages at access point level.

BACKGROUND

Broadcast messages or packets can present challenges in a network environment for several reasons. Firstly, these broadcast messages consume network bandwidth and resources as they are indiscriminately sent to all devices within a network segment, regardless of whether those devices have any interest in the messages. This can lead to network congestion and reduced overall performance. Secondly, broadcast messages can introduce security and privacy vulnerabilities by potentially exposing sensitive information to unauthorized recipients. Lastly, they lack scalability, making them inefficient in large networks, where the sheer volume of devices can lead to excessive broadcast traffic. Therefore, minimizing the use of broadcast messages may be beneficial to maintain network efficiency, security, and scalability.

Multiple network devices, such as access points (APs), switches, etc., in a network may receive the same broadcast messages, like BLE (Bluetooth Low Energy) advertisements, for several reasons. For example, APs are strategically placed within a network to provide optimal coverage, so they can inadvertently receive the same broadcasts from nearby devices. Additionally, the APs may be configured to capture and forward data packets, including broadcast messages, to a centralized system for processing.

Typically, every broadcast an AP receives is forwarded to the centralized system and evaluated against a subscription of an application. However, in practice, most of these advertisement messages may not be subscribed to and are consequently dropped by the centralized system. Accordingly, AP resources and centralized system resources are utilized for processing and forwarding broadcast messages, just to be dropped. Consequently, this inefficient handling of broadcast messages leads to the wastage of computing power and memory resources on both the APs and the centralized system.

SUMMARY OF THE DISCLOSURE

Systems and methods for deriving one or more filter rules to filter unwanted broadcast packets and/or messages at access point level in accordance with embodiments of the disclosure are described herein. In some embodiments, a device includes a processor, a network interface controller configured to provide access to a network, and a memory communicatively coupled to the processor, wherein the memory includes a packet filtering logic that is configured to receive a filtering ruleset, install the filtering ruleset, receive a plurality of broadcast packets from one or more network devices, filter out one or more broadcast packets from the plurality of broadcast packets based on the filtering ruleset, and forward the one or more broadcast packets to a corresponding destination.

In some embodiments, the filtering ruleset includes at least one allow rule that when satisfied by a broadcast packet allows forwarding of the broadcast packet.

In some embodiments, the filtering ruleset includes at least one drop rule that when satisfied by a broadcast packet causes dropping of the broadcast packet.

In some embodiments, the packet filtering logic is further configured to drop at least one other broadcast packet that remains after the filtering out of the one or more broadcast packets from the plurality of broadcast packets.

In some embodiments, the packet filtering logic is further configured to extract at least one of a source device identifier, a data type, and data content from the plurality of broadcast packets.

In some embodiments, filtering out of the one or more broadcast packets from the plurality of broadcast packets is further based on the source device identifier extracted from the plurality of broadcast packets.

In some embodiments, filtering out of the one or more broadcast packets from the plurality of broadcast packets is further based on the data type extracted from the plurality of broadcast packets.

In some embodiments, filtering out of the one or more broadcast packets from the plurality of broadcast packets is further based on the data content extracted from the plurality of broadcast packets.

In some embodiments, the packet filtering logic is further configured to receive a new filtering ruleset, delete the filtering ruleset, and install the new filtering ruleset.

In some embodiments, the new filtering ruleset includes at least one of a new allow rule or a new drop rule.

In some embodiments, a device includes a processor, a network interface controller configured to provide access to a network, and a memory communicatively coupled to the processor, wherein the memory includes a packet filtering logic that is configured to receive one or more subscription topics from one or more applications, evaluate a first set of broadcast packets and a second set of broadcast packets, wherein the first set of broadcast packets is dropped and the second set of broadcast packets is allowed based on the one or more subscription topics, generate a filtering ruleset based on the evaluation of the first set of broadcast packets and the second set of broadcast packets, and transmit the filtering ruleset to a network device.

In some embodiments, the first set of broadcast packets and the second set of broadcast packets are evaluated over a set time period.

In some embodiments, the packet filtering logic is further configured to run a periodic update on the filtering ruleset, and generate a new filtering ruleset based on the periodic update.

In some embodiments, the packet filtering logic is further configured to identify at least one new rule in the new filtering ruleset that is different from the filtering ruleset, and transmit the new filtering ruleset to the network device based on the identified at least one new rule.

In some embodiments, the packet filtering logic is further configured to identify that the new filtering ruleset is same as the filtering ruleset, and discard the new filtering ruleset based on an identification that the new filtering ruleset is same as the filtering ruleset.

In some embodiments, the packet filtering logic is further configured to receive at least one of a new subscription topic or a new filter criteria associated with the one or more subscription topics.

In some embodiments, at least one of the new subscription topic or the new filter criteria is associated with a new allow rule.

In some embodiments, the packet filtering logic is further configured to run an out-of-cycle update on the filtering ruleset prior to a scheduled periodic update based on at least one of the new subscription topic or the new filter criteria being associated with the new allow rule, generate a new filtering ruleset based on the out-of-cycle update, and transmit the new filtering ruleset to the network device.

In some embodiments, the network device is an access point coupled to the device over the network.

In some embodiments, a method for filtering broadcast packets includes receiving a filtering ruleset, installing the filtering ruleset, receiving a plurality of broadcast packets from one or more network devices, filtering out one or more broadcast packets from the plurality of broadcast packets based on the filtering ruleset, and forwarding the one or more broadcast packets to a corresponding destination.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
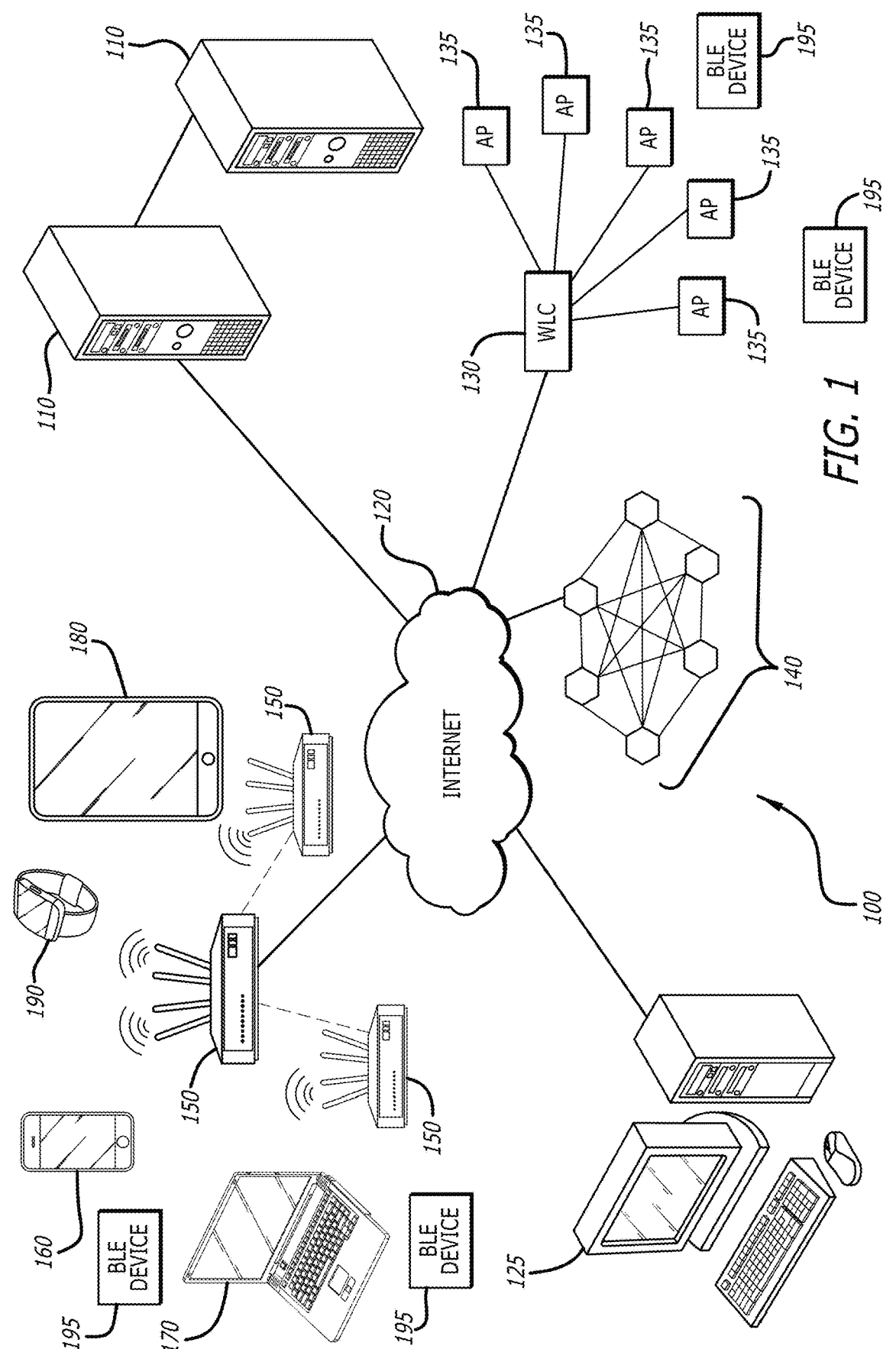
FIG. 1 is a conceptual network diagram of various environments that a networking logic may operate on a plurality of network devices in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that apply one or more filtering criteria at access point (AP) level to reduce the number of broadcast messages or packets forwarded to a control node, for example, a centralized system, a designated network node, or any other network node connected to multiple APs. The control node may provide management and control one or more APs of a network. The control node may be responsible for AP configuration, client authentication, processing of broadcast messages or packets, or the like. Typically, each broadcast message an AP receives is forwarded to a centralized system to be evaluated against subscriptions of one or more applications. However, in practice, most of these broadcast messages may not be subscribed to, resulting in unnecessary processing and forwarding. This inefficient handling of broadcast messages leads to the wastage of computing power and memory resources on both the APs and the centralized system, which is undesirable.

In many embodiments, a network environment may include various network devices (such as APs, switches, hubs, bridges, or the like) connected to and managed by a control node (e.g., a centralized system). In a number of embodiments, the network devices may be responsible for receiving and forwarding broadcast packets. The broadcast packets may refer to a Bluetooth Low Energy (BLE) broadcast packet, Internet Protocol (IP) broadcast packet, Zigbee Network Discovery Packets, or the like. For example, the APs may be equipped with integrated Bluetooth Low Energy (BLE) radios and firmware for receiving and processing BLE advertisements (e.g., broadcast packets). Such APs may support BLE management features and may be capable of sending beacons and listening to beacons from, for example, BLE devices, Internet-of-Things (IoT) devices, or the like. A BLE device can operate in an advertising mode, periodically broadcasting packets that contain information about the BLE device, such as a Universally Unique Identifier (UUID), major/minor IDs, URL, or the like. When an AP receives a broadcast packet, the AP may extract the relevant information such as UUID, major/minor IDs, URL, etc., from the broadcast packet and forward the broadcast packet to the control node.

In a variety of embodiments, the control node may be configured to receive and process broadcast packets from the APs. For example, the control node may process a broadcast packet received from an AP to extract relevant information and evaluate the broadcast packet against one or more subscription topics of one or more applications. Some examples of such applications can include location-based services, indoor navigation, asset tracking, proximity-based marketing, or the like. A subscription topic may refer to a set of criteria, policies, or filters defined by a specific application or a service. For example, an application may provide a subscription topic to define the types of broadcast packets the application is interested in receiving from the control node. The subscription topic can include certain attributes values that are of interest to the application. Examples of such attributes can include, but are not limited to, device identifiers (e.g., MAC addresses), service identifiers, data type, data content, etc. In an example scenario, a location-based service (LBS) application running on the control node or any another device may subscribe to broadcast packets from Wi-Fi or Bluetooth Low Energy (BLE) devices within a specific area (e.g., a shopping mall, a stadium, an airport, etc.). Thus, the control node can evaluate each broadcast packet against the subscription topic of LBS application and provide only the relevant broadcast packets to the LBS application and drop the broadcast packets that do not match the subscription topic of the LBS application. In numerous embodiment, the control node can be any network node that may be configured to process the broadcast packets and forward the processed broadcast packets as per the subscription topic.

In order to solve the issue of APs forwarding every broadcast packet to the control node, in the present disclosure an initial filtering is applied at AP level to enable forwarding of relevant broadcast packets to the control node. In further embodiments, the initial filtering can be applied based on a filtering ruleset. For example, the APs may receive the filtering ruleset from the control node and install the filtering ruleset. The filtering ruleset may include one or more drop rules that when satisfied by a broadcast packet causes dropping of the broadcast packet at AP level. The filtering ruleset can also include one or more allow rules that when satisfied by a broadcast packet allows forwarding of the broadcast packet to the control node. In a scenario where an AP receives a plurality of broadcast packets, the AP may filter out one or more broadcast packets from the plurality of broadcast packets based on the filtering ruleset and forward the one or more broadcast packets to the control node. Broadcast packets that remain after the filtering out of the one or more broadcast packets from the plurality of broadcast packets are dropped by the AP. Dropping of a broadcast packet indicates that the broadcast packet is not forwarded to the control node. In order to apply the filtering ruleset to the plurality of broadcast packets, the AP may extract relevant information such as a source device identifier, a message type, and message content from the plurality of broadcast packets, evaluate the extracted information against the filtering ruleset, and filter out the one or more broadcast packets that need to be forwarded to the control node.

In several embodiments, the one or more applications may provide new subscription topics or may provide new filter criteria for the existing subscription topics to the control node. In such embodiments, the APs may receive, from the control node, a new filtering ruleset that additionally caters to the new subscription topic or the new filter criteria. The APs may delete the older filtering ruleset and install the new filtering ruleset.

In still more embodiments, the control node may be configured to generate the filtering ruleset to enable the initial filtering on the APs. The control node may generate the filtering ruleset by evaluating broadcast packets, for example, over a set time period. The evaluated broadcast packets may include a first set of broadcast packets (referred to as "set of dropped packets") that were dropped during the set time period and a second set of broadcast packets (referred to as "set of allowed packets") that were allowed during the set time period by the control node based on the one or more subscription topics. In several embodiments, the control node may generate a filtering ruleset based on the evaluation of the first set of broadcast packets and the second set of broadcast packets. By evaluating the set of dropped packets, the control node may generate a drop-attribute table and by evaluating the set of allowed packets, the control node may generate an allow-attribute table. The drop-attribute table may include values of various attributes associated with the set of dropped packets and a count of dropped packets associated with each unique attribute-value combination. Examples of the attributes may include, but are not limited to, MAC addresses, device identifiers, service identifiers, advertisement data type, advertisement content, or the like. Similarly, the allow-attribute table may include values of various attributes associated with the set of allowed broadcast packets. Examples of the attributes may include, but are not limited to, MAC addresses, device identifiers, service identifiers, advertisement data type, advertisement content, or the like. The control node may perform a series of operations on the drop-attribute table and the allow-attribute table to identify those attribute-value combinations of the drop-attribute table that do not have any conflict with the allow-attribute table. In many examples, the filtering ruleset may define attribute-value combinations of the drop-attribute table that are non-conflicting with the allow-attribute table. The control node may then transmit the filtering ruleset to the connected APs.

In several more embodiments, the control node may run a periodic update on the filtering ruleset to generate a new filtering ruleset. If the new filtering ruleset includes at least one new rule that is different from the existing filtering ruleset, the control node may transmit the new filtering ruleset to the connected APs. However, if the new filtering ruleset is same as the existing filtering ruleset, the control node may discard the new filtering ruleset.

In numerous embodiments, the control node may receive a new subscription topic or a new filter criteria associated with the one or more subscription topics. If the new subscription topic or the new filter criteria is associated with a new drop rule, the control node may wait for the next update cycle to run an update on the filtering ruleset. However, if the new subscription topic or the new filter criteria is associated with a new allow rule, the control node may run an out-of-cycle update on the filtering ruleset prior to a scheduled periodic update and generate a new filtering ruleset. This ensures that no broadcast packet gets dropped at the AP level which should be allowed as per the new allow rule. Using the filtering ruleset, majority of the broadcast packets may be processed and dropped at the APs. This way the control node may receive only the most relevant broadcast packets that may be subscribed by the one or more applications.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual network diagram 100 of various environments that a networking logic may operate on a plurality of network devices in accordance with various embodiments of the disclosure is shown. Those skilled in the art will recognize that the networking logic can include various hardware and/or software deployments and can be configured in a variety of ways. In many embodiments, the networking logic can be configured as a standalone device, exist as a logic in another network device, be distributed among various network devices operating in tandem, or remotely operated as part of a cloud-based network management tool. In further embodiments, one or more servers 110 can be configured with the networking logic or can otherwise operate as the networking logic. In many embodiments, the networking logic may operate on one or more servers 110 connected to a communication network 120 (shown as the "Internet"). The communication network 120 can include wired networks or wireless networks. The networking logic can be provided as a cloud-based service that can service remote networks, such as, but not limited to a deployed network 140.

However, in additional embodiments, the networking logic may be operated as a distributed logic across multiple network devices. In the embodiment depicted in FIG. 1, a plurality of network access points (APs) 150 can operate as the networking logic in a distributed manner or may have one specific device operate as the networking logic for all of the neighboring or sibling APs 150. The APs 150 may facilitate Wi-Fi connections for various electronic devices, such as but not limited to, mobile computing devices including laptop computers 170, cellular phones 160, portable tablet computers 180, wearable computing devices 190, and Bluetooth Low Energy (BLE) devices 195. BLE devices 195 are electronic devices that utilize Bluetooth Low Energy technology for wireless connectivity. BLE enables devices to communicate over short distances while consuming significantly less power compared to classic Bluetooth. BLE devices may be typically small, battery-powered devices that can operate for extended periods on a single battery charge. BLE technology may be often used in applications like BLE beacons, wearables, fitness trackers, smart home devices, Internet-of-Things (IoT) sensors, mobile devices, or the like.

In further embodiments, the networking logic may be integrated within another network device. In the embodiment depicted in FIG. 1, a wireless LAN controller (WLC) 130 may have an integrated networking logic that the WLC 130 can use to monitor or control power consumption of the APs 135 that the WLC 130 is connected to, either wired or wirelessly. In still more embodiments, a personal computer 125 may be utilized to access and/or manage various aspects of the networking logic, either remotely or within the network itself. In the embodiment depicted in FIG. 1, the personal computer 125 communicates over the communication network 120 and can access the networking logic of the servers 110, or the network APs 150, or the WLC 130. In still more embodiments, the WLC 130 may be capable of monitoring network traffic flowing across the network.

Although a specific embodiment for various environments that the networking logic may operate on a plurality of network devices suitable for carrying out the various steps, processes, methods, and operations described herein is discussed with respect to FIG. 1, any of a variety of systems and/or processes may be utilized in accordance with embodiments of the disclosure. In many non-limiting examples, the networking logic may be provided as a device or software separate from the WLC 130 or the networking logic may be integrated into the WLC 130. The elements depicted in FIG. 1 may also be interchangeable with other elements of FIGS. 2-10 and as required to realize a particularly desired embodiment.

Figure 2:
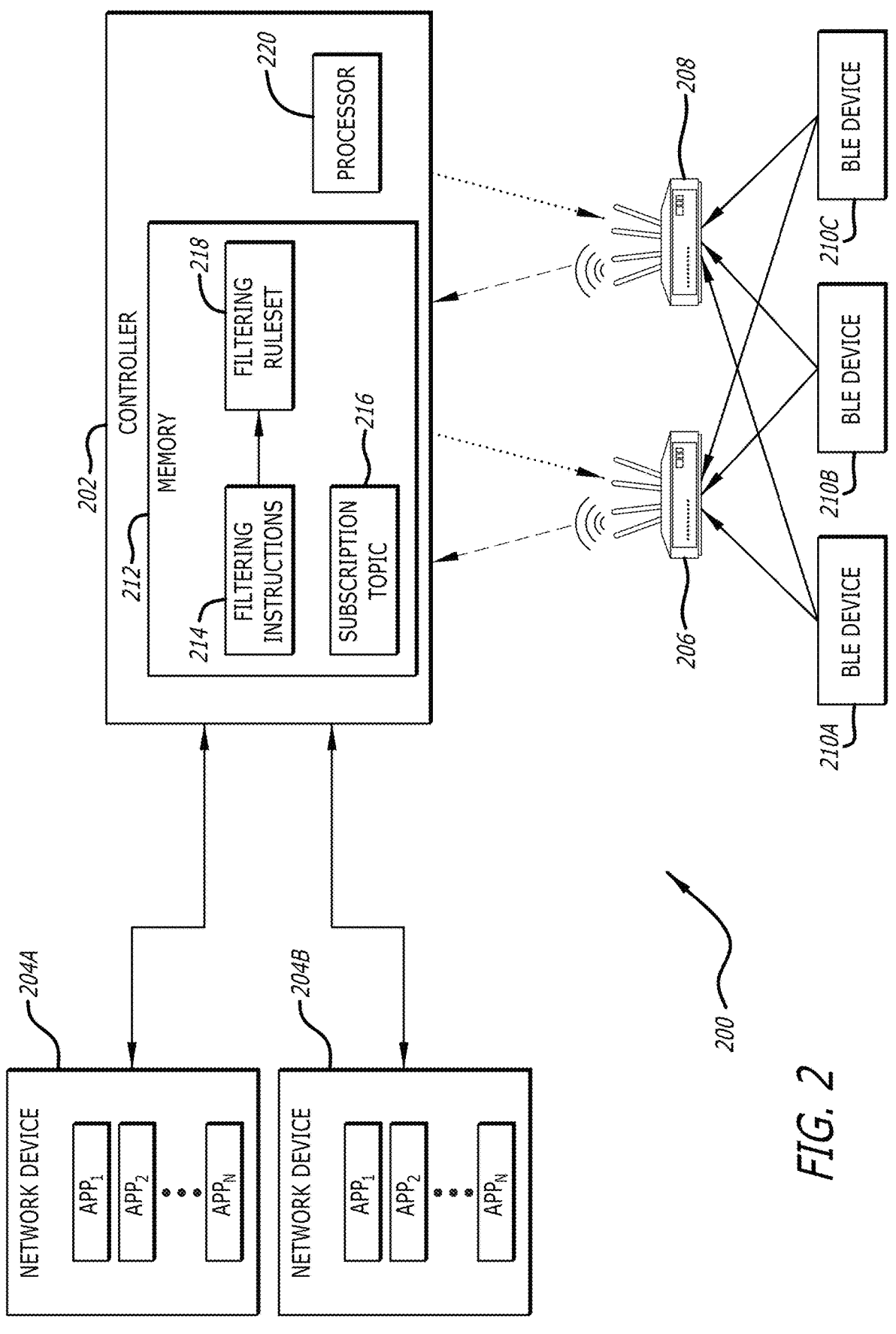
FIG. 2 is a conceptual illustration of a controller managing multiple APs in accordance with various embodiments of the disclosure.

Referring to FIG. 2, a conceptual illustration 200 of a controller managing multiple APs in accordance with various embodiments of the disclosure is shown. The embodiment depicted in FIG. 2 may represent a scenario where a controller 202 (e.g., a designated network device, any other network device, a control node, etc.) is connected to one or more APs 206, 208, and the APs 206, 208 are connected to, for example, one or more BLE devices 210A, 210B, 210C.

Figure 3:
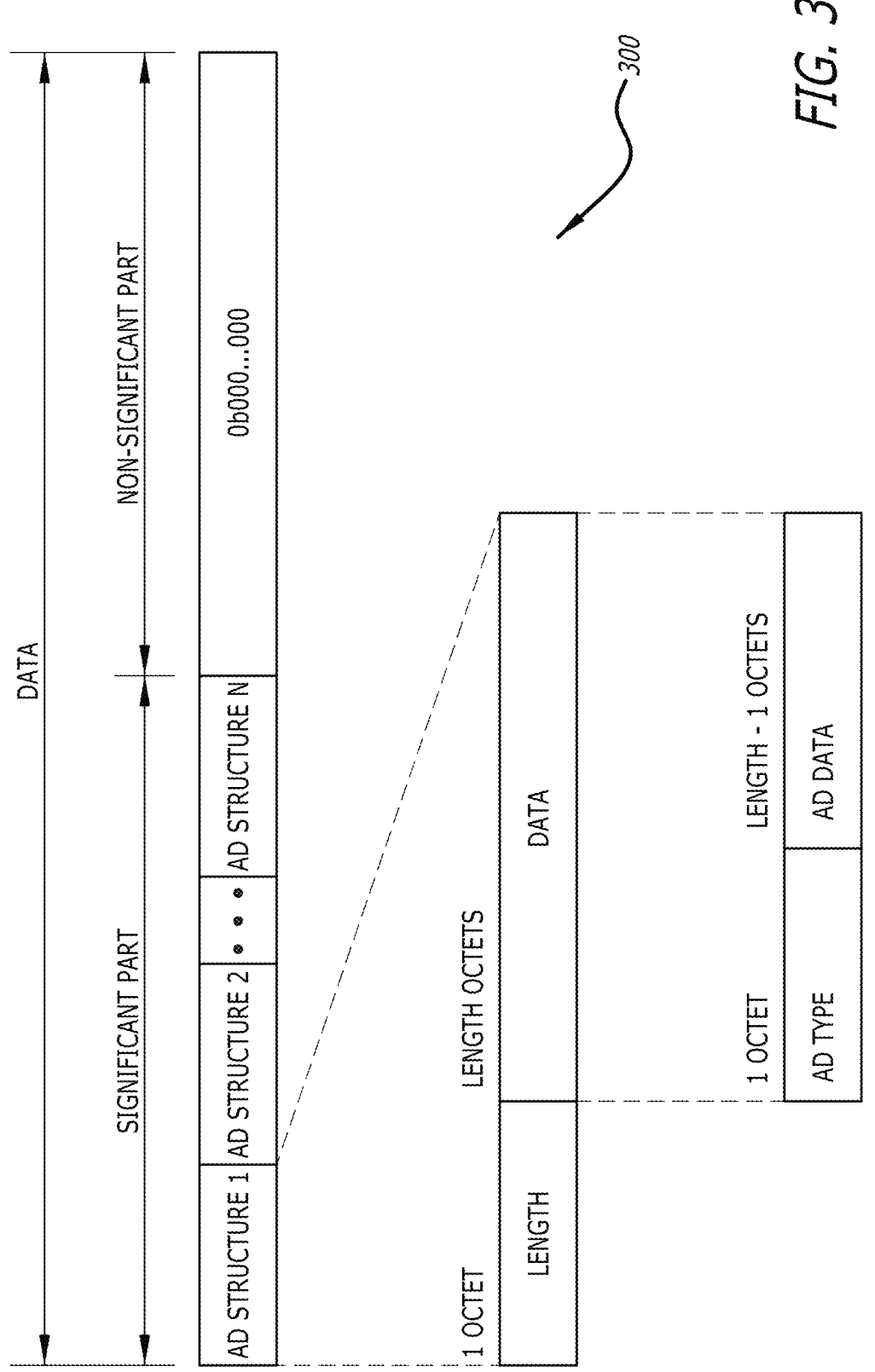
FIG. 3 is a conceptual illustration of an example payload of a BLE advertising packet in accordance with various embodiments of the disclosure.

In many embodiments, the BLE devices 210A, 210B, 210C may be configured to broadcast packets (e.g., BLE advertisement packets) as a means of advertising their presence and capabilities to nearby devices (e.g., the APs 206, 208). For example, the BLE devices 210A, 210B, 210C can operate in an advertising mode, periodically broadcasting packets. The broadcast packets may include essential information such as device name, device identifier (e.g., Media Access Control (MAC) address), services offered, signal strength, Universally Unique Identifier (UUID), major/minor IDs, etc. An example of a broadcast packet is shown in FIG. 3 for illustration purposes.

In a variety of embodiments, the APs 206, 208 may be configured to receive the broadcast packets from the BLE devices 210A, 210B, 210C. The APs 206, 208 may be connected to and managed by the controller 202. In a number of embodiments, the APs 206, 208 may be equipped with integrated BLE radios and firmware to receive and process the broadcast packets. For example, the APs 206, 208 may support a BLE management feature and may be capable of sending beacons and listening to beacons from, for example, BLE devices 210A, 210B, 210C, Internet-of-Things (IoT) devices, or the like. When an AP receives a broadcast packet, the AP may extract the relevant information such as UUID, major/minor IDs, URL, etc., from the broadcast packet and forward the broadcast packet to the controller.

The controller 202 can be, for example, a centralized network management system, a designated network device, or any other network node connected to one or more network devices 204A, 204B. In several embodiments, the network devices 204A, 204B may be configured to run one or more applications APP$_1$-APP$_N$ (collectively "the applications APP$_1$-APP$_N$"). In many examples, the applications APP$_1$-APP$_N$ may relate to location-based services, indoor navigation services, asset tracking, proximity-based marketing, or the like. In numerous embodiments, the applications APP$_1$-APP$_N$ may be deployed (or hosted) on the controller 202. In some embodiments, the applications APP$_1$-APP$_N$ can be deployed on any computing platform, for example, a centralized controller, a cloud infrastructure, an edge computing device, a gateway device, an embedded system, a mobile device, and an end-user device, depending on their requirements and the architecture of the distributed communication environment. The applications APP$_1$-APP$_N$ may refer to software programs or systems designed to utilize broadcast packets (such as BLE advertisements) for specific purposes.

In a number of embodiments, the controller 202 may include a memory 212 that stores filtering instructions 214, subscription topics 216, and a filtering ruleset 218. The controller 202 may also include a processor 220 that may be used to process broadcast packets received from the APs 206, 208. The memory 212 may reside within or externally to the controller 202 and may include any suitable type of memory implemented using any suitable storage technology. For example, in some embodiments, the memory 212 may comprise a Random Access Memory (RAM), a Nonvolatile Memory (NVM) or a combination of a RAM and an NVM. The processor 220 may include any suitable type of processor or a central processing unit (CPU). The processor 220 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In a variety of embodiments, the controller 202 may be configured to receive the subscription topics 216 from the applications APP$_1$-APP$_N$ and store in the memory 212. A subscription topic may refer to a set of criteria, policies, or filters that define the types of broadcast packets an application is interested in receiving and processing. For example, an application (e.g., any of the applications APP$_1$-APP$_N$) may provide a subscription topic to define the types of broadcast packets the application is interested in receiving. The subscription topic can include certain attributes values that are of interest to the application. Examples of such attributes can include, but are not limited to, device identifiers (e.g., MAC addresses), service identifiers, data type, data content, etc. For example, a location-based service application may need to evaluate broadcast packets associated with a 16-bit or 128-bit UUID that represents a specific service and has the form 0x1234. In such a scenario, the location-based service application may provide a subscription topic defining the 16-bit or 128-bit UUID.

In a variety of embodiments, the controller 202 may be configured to receive the broadcast packets from the APs 206, 208 and process the received broadcast packets. For example, the controller 202 may process a broadcast packet received from the AP 206 to extract relevant information, for example, UUID, major/minor IDs, MAC address, data type, data content, etc. The controller 202 may be further configured to utilize the extracted information to evaluate the broadcast packets against the subscription topics 216 of the applications APP$_1$-APP$_N$. For example, the controller 202 may evaluate each broadcast packet to decide whether to drop or allow the broadcast packet. For example, if a broadcast packet matches a subscription topic provided by an application, the controller 202 may provide the broadcast packet to the application for further processing. However, if a broadcast packet does not match any of the subscription topics 216 provided by the applications APP$_1$-APP$_N$, the controller 202 may drop the broadcast packet.

In further embodiments, the filtering instructions 214 may refer to an algorithm, a set of instructions, a set of programming codes, or the like that may be used to generate the filtering ruleset 218. For example, the filtering instructions 214 may evaluate the subscription topics 216, track broadcast packets dropped and allowed by the controller 202 in a given time period based om the subscription topics 216, and generate the filtering ruleset 218. In certain embodiments, the filtering instructions 214 may process the tracked broadcast packets to identify a set of attributes associated with the broadcast packets dropped and allowed by the controller 202. In an example scenario, the filtering instructions 214 may track that a broadcast packet having a specific MAC address with advertisement data related to battery level was dropped in the given time period. Based on the observation of the set of attributes associated with the dropped and allowed packets, the filtering instructions 214 may generate the filtering ruleset 218. In several embodiments, the filtering ruleset 218 may include one or more drop rules that when satisfied by a broadcast packet causes dropping of the broadcast packet. In several more embodiments, the filtering ruleset 218 can also include one or more allow rules that when satisfied by a broadcast packet allows forwarding of the broadcast packet. The controller 202 may transmit the filtering ruleset 218 to the APs 206, 208 for installation. Generation of a filtering ruleset is described later in detail in conjunction with FIG. 5. In numerous additional embodiments, the controller 202 can be any network node that may process the broadcast packets based on the filtering instructions 214 to generate the filtering ruleset 218. For example, the controller 202 may be a router, a hub, a switch, a gateway, a network node, or the like.

In still further embodiments, the filtering ruleset 218 may be installed on the APs 206, 208. Thereafter, the APs 206, 208 may be equipped to drop the broadcast packets that fall under the drop criteria defined by the filtering ruleset 218. The APs 206, 208 thus forward (or transmit) only the allowed broadcast packets to the controller 202 for further processing (shown by dashed arrows from APs 206, 208 to the controller 202).

In still additional embodiments, the filtering instructions 214 may run periodic updates on the filtering ruleset 218. For example, every time a new subscription topic or a filter rule is received by the controller 202 from an application (e.g., any of the applications APP$_1$-APP$_N$ or a new application), the filtering instructions 214 may evaluate if the existing filtering ruleset 218 installed on the APs 206, 208 is still valid or needs to be updated to cater to the new subscription topic or the filter rule. A filter rule may refer to an additional filter criteria specified for an existing subscription topic. For example, an application may have submitted a subscription topic indicating an interest in broadcast packets having data type "AD". Now the same application may not want to receive any broadcast packet that has data content "MQ" even if it has the data type "AD". Thus, the application may submit a filter rule for dropping broadcast packets with data content "MQ". In another scenario, the same application may want to receive only those broadcast packets that have the data type "AD" and that originate from a device with MAC address "IQ". Thus, the application may submit a filter rule for allowing broadcast packets with data type "AD" and MAC address "IQ". In scenarios where the filtering instructions 214 determines that the existing filtering ruleset 218 installed on the APs 206, 208 needs to be updated to cater to the new subscription topic or the filter rule, the filtering instructions 214 generates a new filtering ruleset that replaces the existing filtering ruleset 218 and transmits the new filtering ruleset 218 to the APs 206, 208 for installation (shown by dotted arrows from the controller 202 to the APs 206, 208).

Although a specific embodiment for a controller managing multiple APs in accordance with various embodiments of the disclosure suitable for carrying out the various steps, processes, methods, and operations described herein is discussed with respect to FIG. 2, any of a variety of systems and/or processes may be utilized in accordance with embodiments of the disclosure. For example, in many further embodiments, the controller 202 may be a software-defined networking (SDN) controller that is responsible for managing and controlling the network. The SDN controller may provide a centralized point of control and programmability for the entire network. The elements depicted in FIG. 2 may also be interchangeable with other elements of FIGS. 1 and 3-9 as required to realize a particularly desired embodiment.

Referring to FIG. 3, a conceptual illustration of an example payload 300 of a BLE advertising packet in accordance with various embodiments of the disclosure is shown. In many embodiments, a BLE advertising packet may correspond to a broadcast packet transmitted by a BLE device to broadcast information about itself or its services to nearby BLE central devices, such as smartphones, APs, or other peripherals. The BLE advertising packet may include essential data such as device's unique identifier, service details, and sometimes additional information like device name or sensor data. BLE advertising packets are short, efficient, and designed for low power consumption, making them ideal for use in applications such as proximity sensing, device discovery, location-based services, or the like. BLE advertising packets enable efficient communication between BLE devices, allowing for seamless interactions in various IoT and mobile scenarios.

The BLE advertising packet may include a 16-bit header and the payload 300. The header can be a standard 2-byte field for BLE advertisement packets. The header may include information such as Packet Data Unit (PDU) type, a length of the payload, and other control bits. In several embodiments, where the BLE advertising packet is a legacy BLE advertising packet (prior to Bluetooth 5.0), the maximum size of the payload 300 can be 31 bytes. In several additional embodiments, where the BLE advertising packet is based on Bluetooth 5.0, the maximum size of the payload 300 can be up to 255 bytes. Thus, data can be transmitted up to 255 octets in the BLE advertising packet. Further, the payload 300 of the BLE advertising packet includes multiple structures called advertisement data structures 1-N (AD structures 1-N). Each AD structure 1-N may include a length field, a field to specify the advertisement type (AD Type), and a field for the actual data itself (AD Data).

In many embodiments, filter rules (e.g., drop rules or allow rules) can be defined based on any of these packet fields or any combination of these packet fields, such as header information, PDU type, payload data, AD type, AD data, MAC address, or the like. In various embodiments, a filter rule may include a wildcard '*'. For example, *x may indicate a field value that ends with x; x* may indicate a field value that starts with x; and *x* may indicate a field value that a field value that includes x. In an example, a drop rule may be defined for AD type=*AB. Thus, any broadcast packet that has an AD type that ends in AB will be dropped based on the drop rule. Similarly, an allow rule may be defined for AD content=AX*. Thus, any broadcast packet that has an AD content that starts with AX will be allowed based on the allow rule. The filter rules can be specified by an application or can be determined by a controller based on subscription topics provided by the applications.

As explained in FIG. 2 above, an application may not subscribe to all broadcast packets. Thus, one or more filter rules (for example, described in a filtering ruleset) can be installed on APs to reduce the number of broadcast packets that are forwarded to a controller for processing. In several embodiments, the filtering ruleset can be installed on the APs based on the processing capabilities of the APs. For example, the number of filter rules in the filtering ruleset can be decided based on the processing capabilities of the APs.

Although a specific embodiment of an example BLE advertising packet suitable for carrying out the various steps, processes, methods, and operations described herein is discussed with respect to FIG. 3, any of a variety of systems and/or processes may be utilized in accordance with embodiments of the disclosure. In a variety of embodiments, a broadcast packet may be based on Zigbee protocol, Internet protocol, or any other suitable wireless based protocol. For example, the broadcast packets may be received from one or more Zigbee enabled devices, such as a smart lighting controller in a home automation system may send out broadcast packets to synchronize lighting scenes across multiple light bulbs in a network. Zigbee broadcast packets may contain information such as device IDs (here smart lighting controller), network IDs, and supported services, allowing Zigbee enabled devices to join or form a Zigbee network. The elements depicted in FIG. 3 may also be interchangeable with other elements of FIGS. 1-2 and 4-9 as required to realize a particularly desired embodiment.

Figure 4:
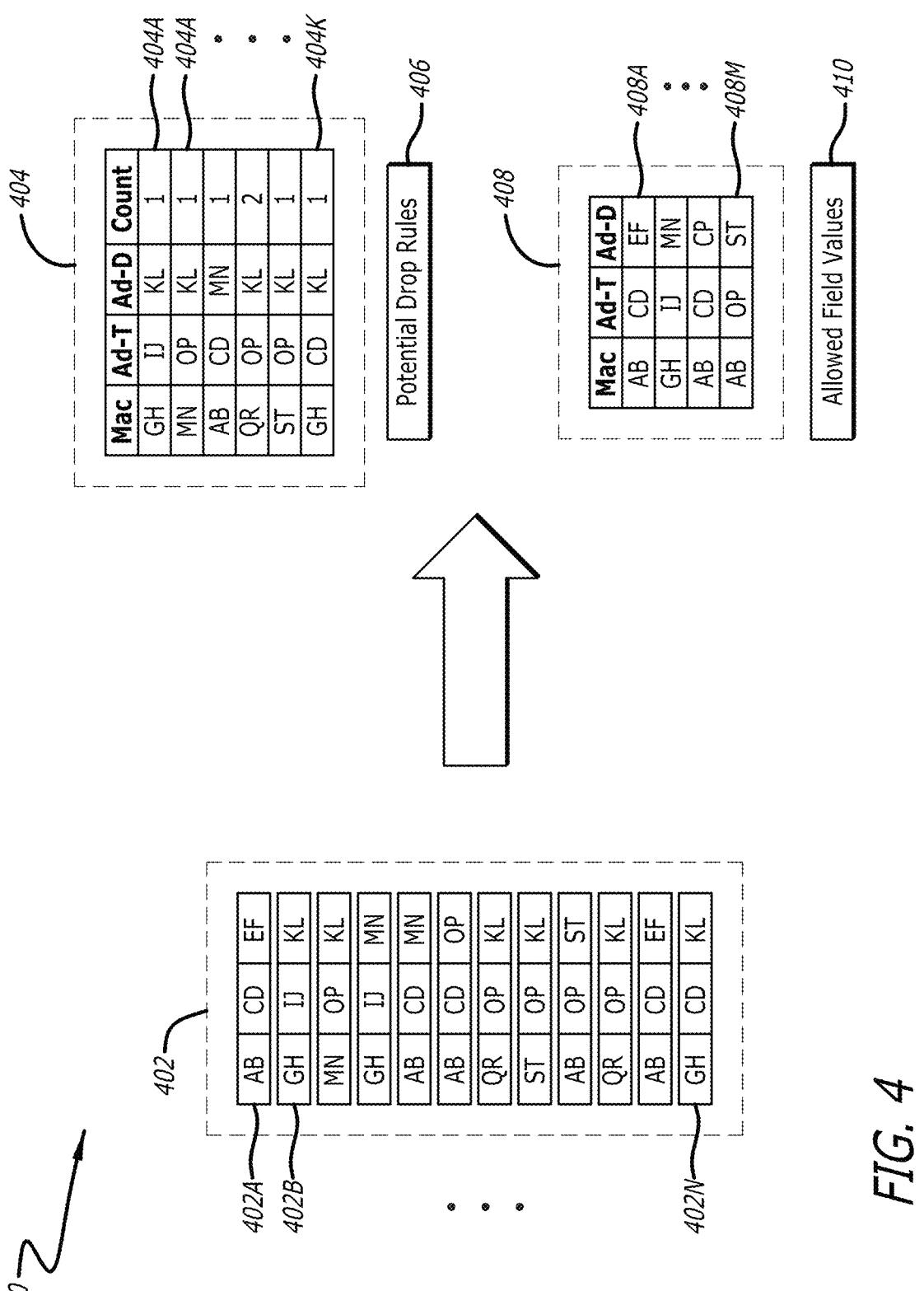
FIG. 4 is a conceptual illustration of a first set of broadcast packets and a second set of broadcast packets evaluated by a controller for filtering ruleset generation in accordance with various embodiments of the disclosure.

Referring to FIG. 4, a conceptual illustration 400 of a first set of broadcast packets and a second set of broadcast packets evaluated by a controller for filtering ruleset generation in accordance with an embodiment of the disclosure is shown. In many embodiments, the controller may track and evaluate, over a set time period, several broadcast packets 402A-402N (collectively "tracked broadcast packets 402") forwarded to the controller by a plurality of APs. These broadcast packets 402A-402N may have been broadcasted by BLE devices. Each broadcast packet 402A-402N may have various fields, for example, a device identifier field, a service identifier field, an AD type field, an AD data field, or the like. For the sake of brevity, the broadcast packets 402A-402N are shown to include three fields: MAC address (Mac), AD Type (Ad-T), and AD data (Ad-D). For example, the broadcast packet 402A has the MAC address as "AB", the AD Type as "CD" and the AD data as "EF". Further, the controller may have received the same broadcast packet multiple times. For example, among the tracked broadcast packets 402. two broadcast packets have the same MAC address "QR", Ad-T "OP", and Ad-D "KL". Thus, indicating that the broadcast packet with MAC address "QR", Ad-T "OP", and Ad-D "KL was forwarded to the controller twice.

The tracked broadcast packets 402 may include the first set of broadcast packets that are dropped by the controller and the second set of broadcast packets that are allowed by the controller, based on one or more subscription topics maintained at the controller. A subscription topic may refer to a set of criteria, policies, or filters that define the types of broadcast packets an application is interested in receiving and processing. Each subscription topic can include certain attribute values that are of interest to corresponding application. Examples of such attributes can include, but are not limited to, a device identifier (e.g., MAC address), a service identifier, an AD type, an AD data, etc. The applications may include software programs or systems that are hosted at the controller or other devices and are designed to utilize the broadcast packets (such as BLE advertisements) for specific purposes.

In more embodiments, by evaluating the first set of broadcast packets (hereinafter, "the first set of dropped packets"), the controller may be configured to generate a drop-attribute table 404. The drop-attribute table 404 may correspond to a data-structure that includes attribute-value combinations of the first set of dropped packets alongside their corresponding packet counts. For example, each row 404A-404K of the drop-attribute table 404 may delineate a unique combination of attribute values, with columns representing individual attributes. For every unique attribute-value combination, the drop-attribute table 404 further provides the count of dropped packets associated with that specific unique combination. For example, row 404A may indicate that among the first set of dropped packets one dropped packet had the MAC address as "GH", Ad-T as "IJ", and Ad-D as "KL" while row 404B may indicate that among the first set of dropped packets one dropped packet had the MAC address as "MN", Ad-T as "OP", and Ad-D as "KL". In further embodiments, the controller may utilize various algorithms (for example, association rule mining, coarse grain filtering, clustering and segmentation, etc.) to evaluate the drop-attribute table 404 and determine potential drop rules 406. In an example, one drop rule can indicate that packets with the MAC address as "MN", Ad-T as "OP", and Ad-D as "KL" are to be dropped.

In still more embodiments, by evaluating the second set of broadcast packets (hereinafter, "the second set of allowed packets"), the controller may be configured to generate an allow-attribute table 408. The allow-attribute table 408 may correspond to a data-structure that includes attribute-value combinations of the second set of allowed packets. For example, each row 408A-408M of the allow-attribute table 408 may delineate a unique combination of attribute values, with columns representing individual attribute. For example, row 408A may indicate that among the second set of allowed packets at least one allowed packet had the MAC address as "AP", Ad-T as "CD", and Ad-D as EF" while row 408M may indicate that among the second set of allowed packets at least one allowed packet had the MAC address as "AB", Ad-T as "OP", and Ad-D as "ST". In further additional embodiments, the controller may utilize various algorithms (for example, association rule mining, coarse grain filtering, clustering and segmentation, etc.) to evaluate the allow-attribute table 408 and determine allowed field values 410. Allowed field values 410 may include various attribute-value combinations for which the broadcast packets were allowed by the controller. The controller may utilize the drop-attribute table 404 and the allow-attribute table 408 to generate a filtering ruleset for the APs to perform an initial packet filtering before forwarding the broadcast packets to the controller, as will be explained in greater detail in conjunction with FIG. 5 of the present disclosure.

Although a specific embodiment for illustrating the correlation between one or more broadcast packets and packets dropped and consumed suitable for carrying out the various steps, processes, methods, and operations described herein is discussed with respect to FIG. 4, any of a variety of systems and/or processes may be utilized in accordance with embodiments of the disclosure. For example, in still further embodiments, the controller may utilize an artificial neural network, such as decisions trees, random forests, support vector machines, naïve Bayes, or K-nearest neighbors algorithms to determine the potential drop rules 406 and the allowed field values 410. The elements depicted in FIG. 4 may also be interchangeable with other elements of FIGS. 1-3 and 5-9 as required to realize a particularly desired embodiment.

Figure 5:
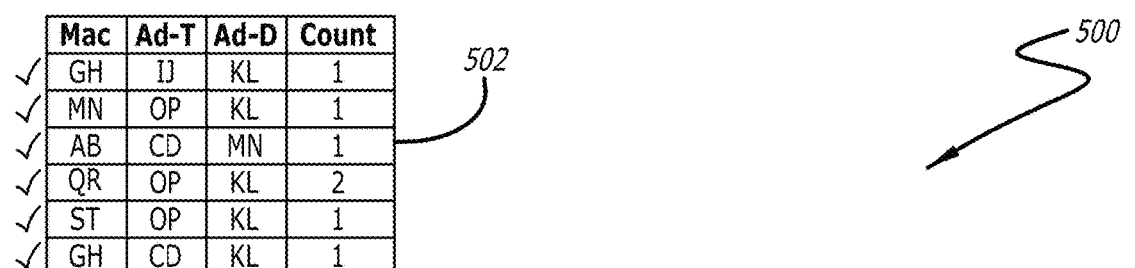
FIG. 5 is a conceptual illustration for generating a filtering ruleset for APs in accordance with various embodiments of the disclosure.
Figure 5:
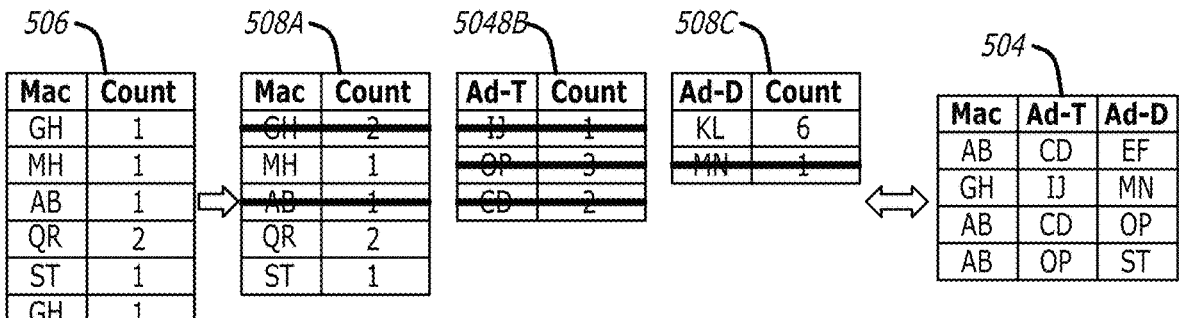
Figure 5:
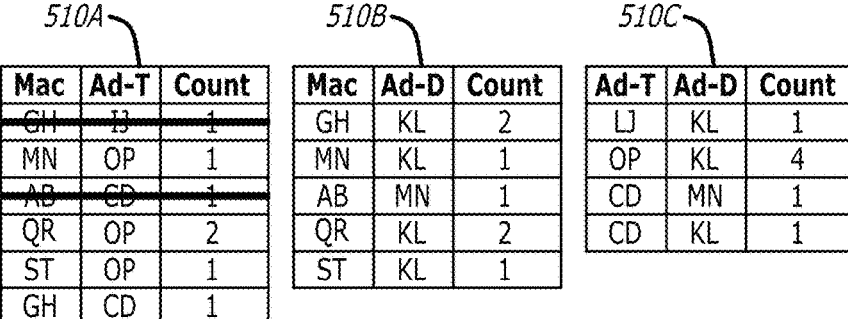
Figure 5:
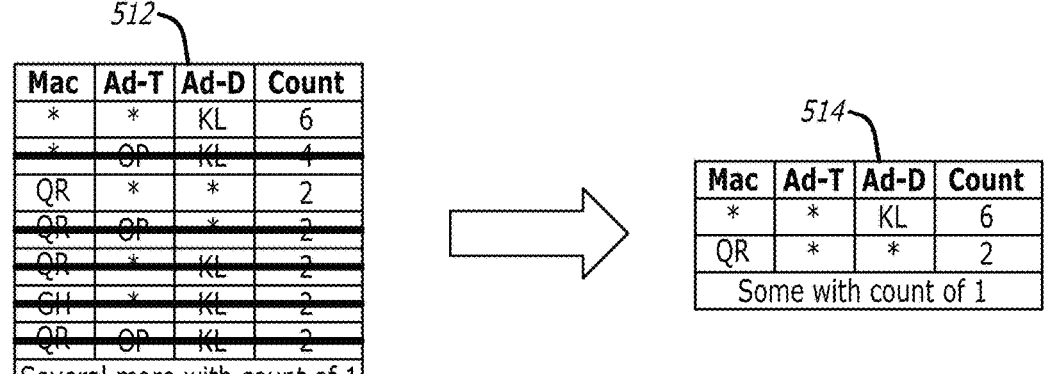

Referring to FIG. 5, a conceptual illustration 500 for generating a filtering ruleset for APs in accordance with an embodiment of the disclosure is shown. The embodiments shown in FIG. 5 illustrate a drop-attribute table 502 and an allow-attribute table 504 generated by a controller. In many embodiments, the controller may generate the drop-attribute table 502 and the allow-attribute table 504 by evaluating, over a set time period, a first set of broadcast packets that are dropped by the controller and a second set of broadcast packets that are allowed by the controller, based on one or more subscription topics maintained at the controller. A subscription topic may refer to a set of criteria, policies, or filters that define the types of broadcast packets an application is interested in receiving and processing. The drop-attribute table 502 may correspond to a data-structure that includes attribute-value combinations associated with the first set of broadcast packets alongside dropped packet count associated each attribute-value combination. Likewise, the allow-attribute table 504 may correspond to a data-structure that includes attribute-value combinations associated with the second set of broadcast packets. Examples of the attributes referred to in the drop-attribute table 502 and the allow-attribute table 504 may include, but are not limited to, MAC address (Mac), advertisement data type (Ad-T), advertisement data (Ad-D), or the like. In several embodiments, the controller may collate historical broadcast packets that were processed by the controller, for example, over a period of time, in the past. The historical broadcast packets may include the first set of broadcast packets and the second set of broadcast packets.

In additional embodiments, the controller may extract various attribute combinations (such as one attribute or combination of two or more attributes) from the drop-attribute table 502. The controller may then evaluate the extracted attribute combinations against the allow-attribute table 504 and eliminate those attribute-value combinations that conflict with the allow-attribute table 504. In other words, the controller may obtain subset-tables from the drop-attribute table 502 by selecting one or more attribute columns along with the count column and compare the subset tables with the allow-attribute table 504 to eliminate those attribute-value combinations that conflict with the allow-attribute table 504.

In an example scenario shown in FIG. 5, the controller may extract the "Mac" attribute column and the "Count" column from the drop-attribute table 502 to obtain an intermediate subset table 506. The intermediate subset table 506 is a single attribute subset table. In certain embodiments, where an intermediate subset table obtained from the drop-attribute table 502 includes duplicate values in the attribute column, the controller may merge such duplicate values into a single row and the counts of such duplicate values are aggregated to provide a cumulative count for the merged row. For example, in the intermediate subset table 506, the MAC address "GH" appears in two rows, each having a count of "1". Thus, the controller may merge the two "GH" rows into one, aggregate the counts of the two rows, and obtain a first condensed subset table 508A for the attribute "Mac". This process condenses the data, ensuring each attribute-value combination is represented uniquely while accurately reflecting the total count of dropped packets associated with each combination. Likewise, the controller may obtain a second condensed subset table 508B for the attribute "Ad-T" and a third condensed subset table 508C for the attribute "Ad-D". Further, the controller may obtain a fourth condensed subset table 510A for the attributes "Mac" and "Ad-T", a fifth condensed subset table 510V for the attributes "Mac" and "Ad-D", and a sixth condensed subset table 510C for the attributes "Ad-T" and "Ad-D" based on the drop-attribute table 502.

In more embodiments, the controller may evaluate each condensed subset table against the allow-attribute table 504 to eliminate any such attribute-value combination that is in conflict with the allow-attribute table 504. For example, in the first condensed subset table 508A, Mac "GH" is associated with two dropped packets, whereas in the allow-attribute table 504, Mac "GH" is associated with an allowed packet. Consequently, the controller may eliminate the attribute-value combination Mac "GH", depicted as strikethrough line in the first condensed subset table 508A. Similarly, MAC "AB" is also eliminated. The attribute-value combinations that are not in conflict with the allow-attribute table 504, are depicted as non-strikethrough. In a similar manner, the controller may evaluate the second through sixth condensed subset tables 508B, 508C, and 510A-510C and eliminate conflicting attribute-value combinations.

In still further embodiments, the controller may execute a pruning operation on the evaluated first through sixth condensed subset tables 508A-508C and 510A-510C (collectively, "subset tables 508A-508C and 510A-510C") and the drop-attribute table 502 to generate the filtering ruleset for one or more APs. In the pruning operation, the controller may collate non-conflicting attribute-value combinations in the subset tables 508A-508C and 510A-510C and the drop-attribute table 502 in order of a decreasing packet count (e.g., non-conflicting attribute-value combination with the highest number of dropped packet count on top). For example, the controller may derive a collated table 512 that lists all non-conflicting attribute-value combinations of the subset tables 508A-508C and 510A-510C and the drop-attribute table 502 in the order of decreasing dropped packet count. As shown in FIG. 5, the collated table 512 includes an attribute-value combination Ad-D as "KL" on top. Since the attribute-value combination Ad-D as "KL" is obtained from the third condensed subset table 508C associated with a single attribute, other attribute values in the first row are represented by an asterisk ("*"), indicating that MAC and Ad-T attributes can have any value. Similarly, the second highest dropped packet count among all the subset tables 508A-508C and 510A-510C and the drop-attribute table 502 is "4" for the attribute-value combination of Ad-T as "OP" and Ad-D as "KL". In a scenario, where any attribute-value combination in the collated table 512 is a subset of another attribute-value combination in the collated table 512, the controller may eliminate the subset to remove redundancy. For example, in the collated table 512, the second row with Mac as "*", Ad-T as "OP" and Ad-D as "KL" is a subset of the first row with Mac as "*", Ad-T as "*" and Ad-D as "KL". Thus, the controller may eliminate the second row, depicted as strikethrough in the collated table 512. The same process may be repeated for the remaining rows in the collated table 512.

In still additional embodiments, once the pruning operation is complete, the controller may select the remaining attribute-value combinations from the collated table 512 to generate a filtering ruleset 514. In other words, the filtering ruleset 514 may include those attribute-value combinations that have no conflict with the allow-attribute table 504. In some more embodiments, the controller may transmit the filtering ruleset 514 to be installed on the one or more APs connected to the controller.

In several more embodiments, the controller may be configured to repeat the filtering ruleset generation process described above at periodic intervals to periodically update the filtering ruleset to cater to any new subscription topics or filter rules received from applications. The controller can also run out-of-order updates on the filtering ruleset if a new drop rule is received that is in conflict with the filtering ruleset.

Although a specific embodiment for generating a filtering ruleset for APs suitable for carrying out the various steps, processes, methods, and operations described herein is discussed with respect to FIG. 5, any of a variety of systems and/or processes may be utilized in accordance with embodiments of the disclosure. For example, in several embodiments, the controller may only select those attribute-value combinations from the collated table 512 for which the dropped packet count value is greater than a threshold value. The threshold value can be a dynamic parameter set by the controller based on computation capabilities of the APs. Higher are the computation capabilities lower is the threshold value. In an example scenario, the controller may set the threshold value in a manner that the filtering ruleset 514 can drop approximately 80% of irrelevant broadcast packets at AP level and remaining 20% can be processed at the controller. The elements depicted in FIG. 5 may also be interchangeable with other elements of FIGS. 1-4 and 6-9 as required to realize a particularly desired embodiment.

Figure 6:
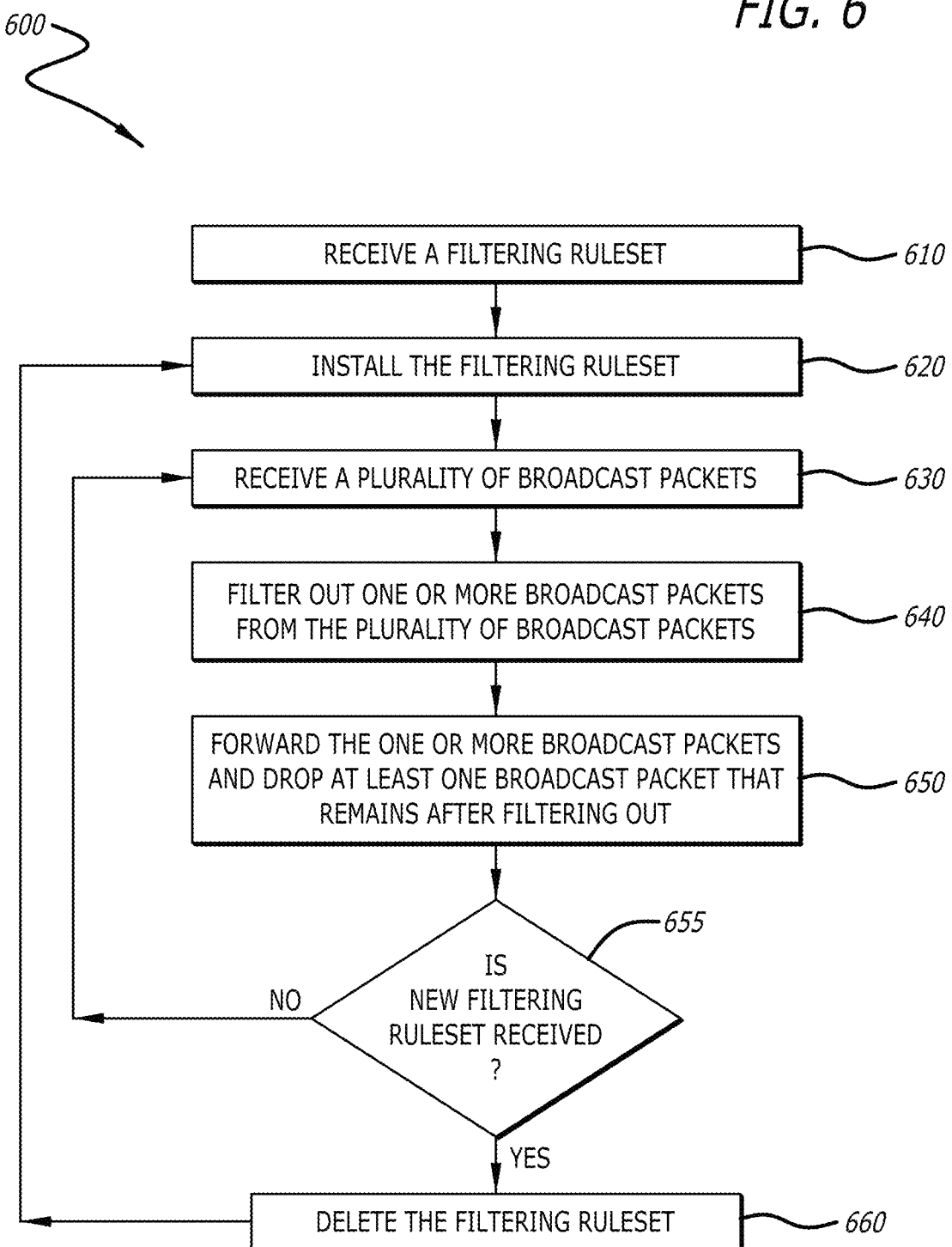
FIG. 6 is a flowchart showing a process for installing a filtering ruleset on an AP in accordance with various embodiments of the disclosure.

Referring to FIG. 6, a flowchart showing a process 600 for installing a filtering ruleset on an AP in accordance with an embodiment of the disclosure is shown. In many embodiments, the process 600 may receive a filtering ruleset (block 610). The filtering ruleset may be received from a controller of a network. In a number of embodiments, the filtering ruleset may include a set of rules or criteria based on which an AP may determine whether to drop a received broadcast packet or forward to the controller. The filtering ruleset may include a set of drop rules, a set of allow rules, or a combination thereof. In a variety of embodiments, the process 600 may install the filtering ruleset (block 620). The filtering ruleset needs to be installed on the APs so that the rules may be set in place to process the one or more broadcast packets received by the APs.

In some embodiments, the process 600 may receive a plurality of broadcast packets (block 630). The broadcast packets may be received from one or more BLE devices present in the network. The BLE devices can operate in an advertising mode, periodically broadcasting packets. The broadcast packets may include essential information such as device name, device identifier (e.g., MAC address), services offered, signal strength, UUID, major/minor IDs, etc. The BLE devices may broadcast advertising packets to inform other network devices regarding their capabilities. The BLE devices may include Internet-of-Things (IoT) devices, beacons, asset trackers, wireless sensors, smart tags, mobile devices, or the like. In an example scenario, in a large event such as a music festival or a sports event, there may be multiple APs spread throughout the venue to provide Wi-Fi connectivity to attendees. There may be vendors present at the event that would want to promote their products or services by using BLE beacons. These vendors thus use BLE beacons to broadcast messages that may be received by the one or more APs of the venue. In numerous embodiments, the process 600 may receive the broadcast packets from any network device such as APs, routers, security management systems, firewalls, or the like. For example, an AP or a router may broadcast beacon frames to advertise the capabilities of the network, such as supported data rates, security settings, network identifier, etc. A firewall or intrusion detection/prevention systems (IDS/IPS) may generate broadcast packets to propagate policy updates to other devices within the network. A firewall may broadcast updated firewall rules to all network devices to ensure consistent enforcement of access control policies.

In more embodiments, the process 600 may filter out one or more broadcast packets from the plurality of broadcast packets (block 640). The process 600 may use the installed filtering ruleset to filter out one or more broadcast packets received by the APs. In several embodiments, the process may extract at least one of: a source device identifier, a data type, and data content from each of the plurality of broadcast packets and may filter out the one or more broadcast packets from the plurality of broadcast packets based on at least one of the source device identifier, the data type, or the data content extracted from the plurality of broadcast packets. In the example discussed above regarding the music festival, the filtering ruleset may include rules to drop broadcast packets received from smart wearable devices, fitness trackers, sensors present on equipment, or the like, which can be identified by their UUID. The filtering ruleset may also define to allow broadcast packets from beacons of one or more vendors registered at the venue. Thus, the one or more APs may filter out the broadcast packets received from the beacon devices of the one or more vendors, while dropping the remaining broadcast packets.

In additional embodiments, the process 600 may forward the one or more broadcast packets and drop at least one other broadcast packet that remains after the filtering out of the one or more broadcast packets (block 650). The process 600 may forward the one or more filtered broadcast packets to a controller. The broadcast packets that remains after the filtering out of the one or more broadcast packets are dropped by the process 600. The controller may be a central entity that provides central management for network devices such as APs, routers, switches, hubs, BLE devices, user equipment, or the like. The controller may further process the received broadcast packets. Continuing with the example scenario above, the one or more APs may forward the filtered broadcast packets to the controller. The controller may process the received BLE advertisements and perform processing of the BLE broadcast packets such as filtering, aggregating, or analyzing the data. Once the processing is done, the controller may forward the BLE broadcast packets to applications related to the music festival. The applications can thus push the received BLE broadcast packets to applications running on attendees' smartphones, for example, to display special coupons, notifications, or offers based on the BLE broadcast packets.

In further embodiments, the process 600 may determine if a new filtering ruleset is received (block 655). The process 600 may receive a new filtering ruleset from the controller after a fixed period of time or when a periodic update is run by the controller on the filtering ruleset. When the process 600, in still more embodiments, determines that no new filtering ruleset is received, it may continue with the process of receiving a plurality of broadcast packets and filtering as per the existing filtering ruleset (block 630).

However, in still more embodiments, when the new filtering ruleset is received, the process 600 may delete the filtering ruleset (block 660). The process 600 may delete the filtering ruleset as the older filtering ruleset may not be applicable anymore. More specifically, the new filtering ruleset may include one or more new allow rules or one or more new drop rules that were not included in the deleted filtering ruleset. After deleting the filtering ruleset, the process 600 may install the new filtering ruleset and continue with the remaining process (block 620).

Although a specific embodiment for installing a filtering ruleset on an AP is shown with respect to FIG. 6, any of a variety of systems and/or processes may be utilized in accordance with embodiments of the disclosure. For example, the AP may receive a new filtering ruleset based on an out-of-cycle update run at the controller instead of a periodic update. The elements depicted in FIG. 6 may also be interchangeable with other elements of FIGS. 1-5 and 7-9 as required to realize a particularly desired embodiment.

Figure 7:
FIG. 7 is a flowchart showing a process for a controller generating a filtering ruleset in accordance with various embodiments of the disclosure.

Referring to FIG. 7, a flowchart showing a process 700 for a controller generating a filtering ruleset in accordance with an embodiment of the disclosure is shown. In many embodiments, the process 700 may receive one or more subscription topics (block 710). The subscription topics may refer to a set of criteria that defines the types of broadcast packets an application is interested in receiving and processing. In a number of embodiments, the subscription topics may refer to a set of allow rules or drop rules for the broadcast packets.

In a variety of embodiments, the process 700 may evaluate a first set of broadcast packets and a second set of broadcast packets (block 720). The process 700 may have dropped the first set of broadcast packets and allowed the second set of broadcast packets based on the subscription topics. For example, the process 700 may have allowed one or more broadcast messages received from a beacon device, whereas may have dropped one or more broadcast messages received from an asset tracker. The first set of broadcast packets and the second set of broadcast packets are evaluated over a set time period.

In some embodiments, the process 700 may generate a filtering ruleset (730). The process 700 may be run on a controller of a network. The controller may run an algorithm that may track several broadcast packets over a given period of time. In more embodiments, the algorithm may track the several broadcast packets for any given combination of subscription topics. Based on the evaluation of attribute-value combinations associated with the first set of packets and the second set of packets, the process 700 may generate the filtering ruleset. The filtering ruleset may include those attribute-value combinations that do not have any conflict with the attribute-value combinations of the second set of broadcast packets.

In additional embodiments, the process 700 may transmit the filtering ruleset (block 740). The process 700 may transmit the filtering ruleset to one or more APs connected to the controller. The filtering ruleset may equip the APs to process and drop any unsubscribed broadcast packets at AP level. The APs, thus, forwards only the relevant broadcast packets as per the subscription topics. This ensures that the resources of the controller are not wasted in processing the broadcast packets that may be ultimately dropped.

In further embodiments, the process 700 may run a periodic update (block 750). The process 700 may run a periodic update to accommodate any new subscription topic or any new filter rule, defined for the existing subscription topics, received by the controller. In still more embodiments, the process 700 may generate a new filtering ruleset (block 760). In numerous embodiments, the new filtering ruleset can be same as the previous filtering ruleset. In numerous other embodiments, the new filtering ruleset can include at least one new filter rule that is different from the previous filtering ruleset. For example, the new filtering ruleset may include a new allow rule or a new drop rule.

In still further embodiments, the process 700 may determine whether the new filtering ruleset is same as the previous filtering ruleset (block 765). The process 700 may determine that the new filtering ruleset is same as the previous filtering ruleset when no filter rule in the previous filtering ruleset is in conflict with the new filtering ruleset. Further, the process 700 may determine that the new filtering ruleset is same as the previous filtering ruleset when filter rules in the previous filtering ruleset are same as filter rules in the new filtering ruleset. However, the process 700 may determine that the new filtering ruleset is different from the previous filtering ruleset, when at least one filter rule in the previous filtering ruleset is in conflict with the new filtering ruleset. Further, the process 700 may determine that the new filtering ruleset is different from the previous filtering ruleset, when the new filtering ruleset includes at least one new filter rule that is different from the previous filtering ruleset. In several more embodiments, where the process 700 determines that the new filtering ruleset is same as the previous filtering ruleset, the process 700 may discard the new filtering ruleset and run the next periodic update as per schedule (block 750).

However, in still additional embodiments, when the process 700 determines that the new filtering ruleset is not the same as the previous filtering ruleset, the process 700 may transmit the new filtering ruleset (block 770). The process 700 may transmit the new filtering ruleset to the one or more APs. The new filtering ruleset may be transmitted as an over-the-air update to the one or more APs. The previous filtering ruleset is deleted and the new filtering ruleset may be installed at the one or more APs.

Although a specific embodiment for a controller generating a filtering ruleset is shown with respect to FIG. 7, any of a variety of systems and/or processes may be utilized in accordance with embodiments of the disclosure. For example, the process 700 may use a connected platform (such as Cisco's Connected Mobile Experiences (CMX)) that may provide location-based services and analytics for businesses and organizations. The elements depicted in FIG. 7 may also be interchangeable with other elements of FIGS. 1-6 and 8-9 as required to realize a particularly desired embodiment.

Figure 8:
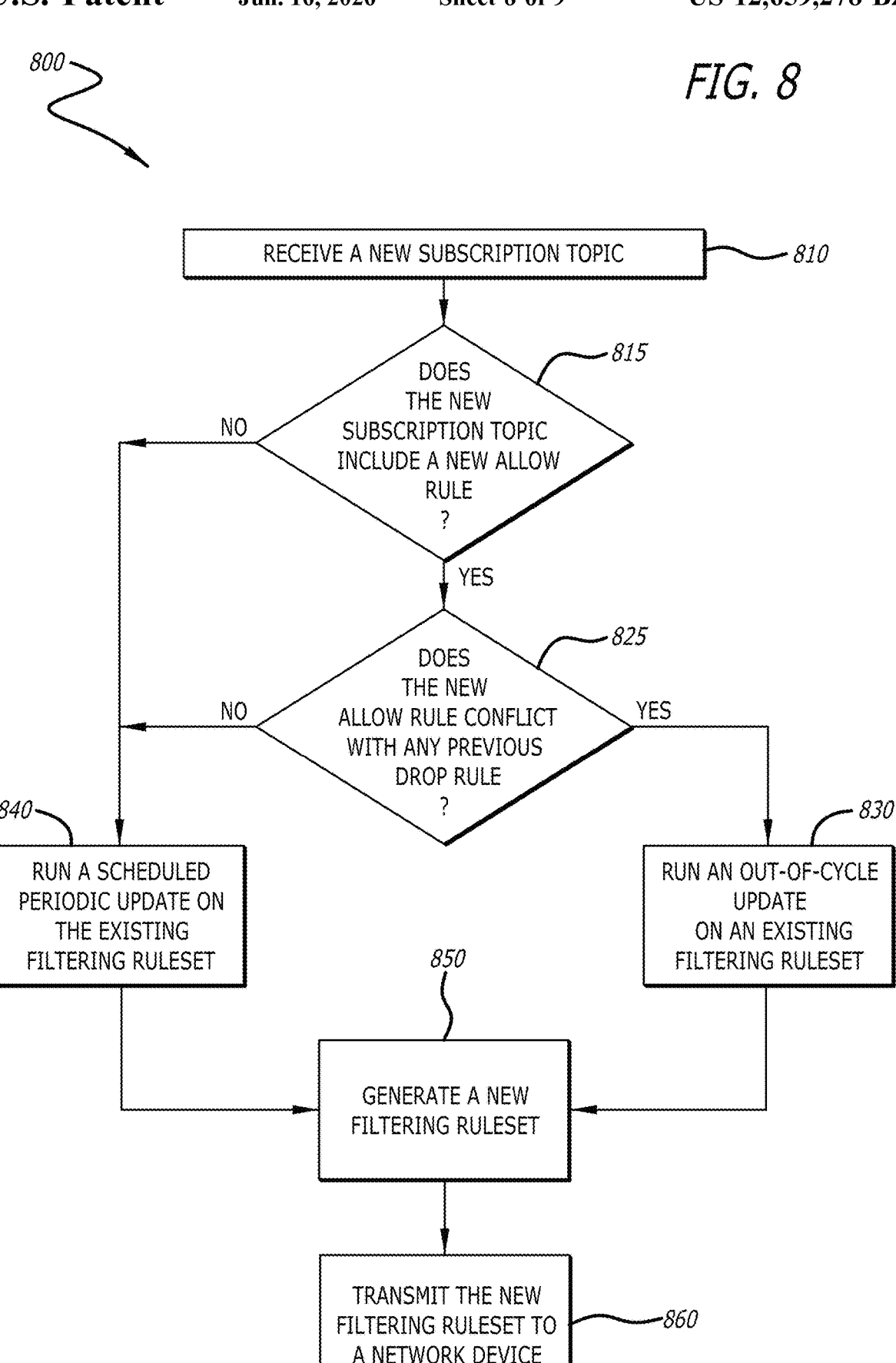
FIG. 8 is a flowchart showing a process for updating a filtering ruleset in accordance with various embodiments of the disclosure.

Referring to FIG. 8, a flowchart showing a process 800 for updating a filtering ruleset in accordance with an embodiment of the disclosure is shown. In many embodiments, the process 800 may receive a new subscription topic (block 810). Subscription topic may refer to a set of criteria that defines the types of broadcast messages an application is interested in receiving and processing. In a number of embodiments, the subscription topic may refer to a set of allow rules or drop rules for the broadcast packets.

In a number of embodiments, the process 800 may determine if the new subscription topic includes a new allow rule (block 815). The new allow rule may refer to one or more criteria based on which broadcast packets received by an AP are to be filtered out and forwarded to a controller. In some embodiments, when the process 800 determines that the new subscription topic includes a new allow rule, the process 800 may further determine if the new allow rule has a conflict with any previous drop rule (block 825). The new allow rule may be determined to be conflicting with a previous drop rule, when an attribute value included in the allow rule is used as a drop criteria in the previous drop rule.

In more embodiments, if it is determined by the process 800 that there is a conflict between the new allow rule and any previous drop rule, the process 800 may run an out-of-cycle update on an existing filtering ruleset (block 830). The process 800 may run the out-of-cycle update on the existing filtering ruleset to ensure that no such broadcast packet is dropped by the AP which is required to be allowed as per the new allow rule. In other words, the process 800 may immediately run an update on the existing filtering ruleset when there is a conflict between the new allow rule and any previous drop rule, without waiting for the next scheduled update.

In a variety of embodiments, if the process 800 determines that the new subscription topic does not include a new allow rule, the process 800 may run a scheduled periodic update on the existing filtering ruleset (block 840). In addition, if the process 800 determines that the new subscription topic includes a new allow rule and the new allow rule does not have any conflict with any previous drop rule, the process 800 may run the scheduled periodic update on the existing filtering ruleset (block 840).

In additional embodiments, the process 800 may generate a new filtering ruleset (block 850). The process 800 can generate the new filtering ruleset based on the scheduled periodic update or the out-of-cycle update. The new filtering ruleset may include additional allow rules, drop rules, or may not have any changes than the previous filtering ruleset.

In further embodiments, the process 800 may transmit the new filtering ruleset to a network device (block 860). The process 800 may transmit the filtering ruleset to one or more APs present in the network. The APs may delete the previous filtering ruleset and install the new filtering ruleset to filter out irrelevant broadcast packets.

Although a specific embodiment for a controller generating a filtering ruleset is shown with respect to FIG. 8, any of a variety of systems and/or processes may be utilized in accordance with embodiments of the disclosure. For example, in still further embodiments, the process 800 may transmit the new filtering ruleset to one or more switches, or one or more bridges operating in the network. The elements depicted in FIG. 8 may also be interchangeable with other elements of FIGS. 1-7 and 9 as required to realize a particularly desired embodiment.

Figure 9:
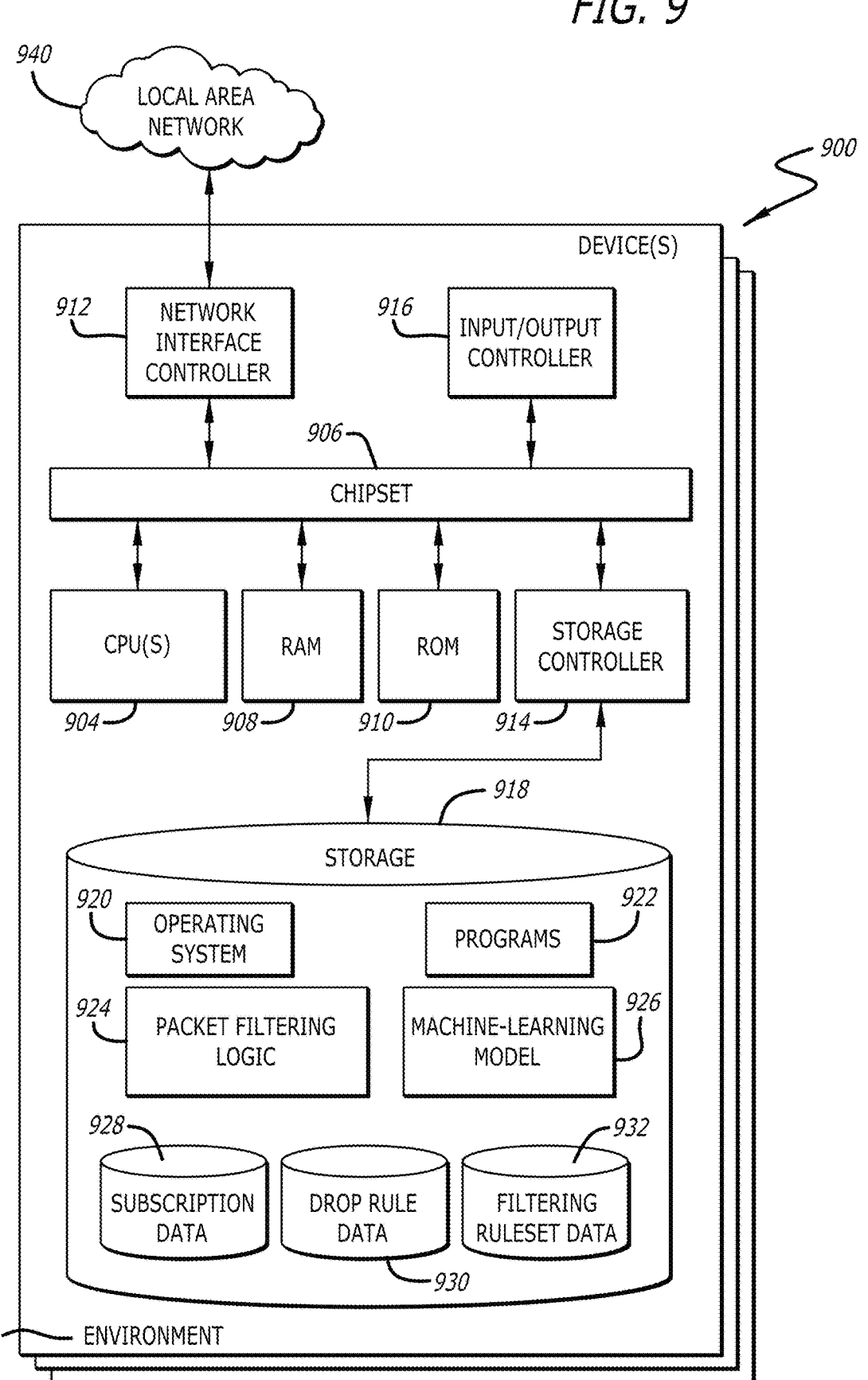
FIG. 9 is a conceptual block diagram for one or more devices 900 capable of executing components and logic for implementing the functionality and embodiments described above in accordance with various embodiments of the disclosure.

Referring to FIG. 9, conceptual block diagram for one or more devices 900 capable of executing components and logic for implementing the functionality and embodiments described above in accordance with various embodiments of the disclosure is shown. The embodiment of the conceptual block diagram depicted in FIG. 9 can illustrate a conventional server, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 9 can also illustrate an access point, a switch, or a router in accordance with various embodiments of the disclosure. The device 900 may, in many non-limiting examples, correspond to physical devices or to virtual resources described herein.

In many embodiments, the device 900 may include an environment 902 such as a baseboard or "motherboard," in physical embodiments that can be configured as a printed circuit board with a multitude of components or devices connected by way of a system bus or other electrical communication paths. Conceptually, in virtualized embodiments, the environment 902 may be a virtual environment that encompasses and executes the remaining components and resources of the device 900. In more embodiments, one or more processors 904, such as, but not limited to, central processing units ("CPUs") can be configured to operate in conjunction with a chipset 906. The processor(s) 904 can be standard programmable CPUs that perform arithmetic and logical operations necessary for the operation of the device 900.

In a number of embodiments, the processor(s) 904 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 906 may provide an interface between the processor(s) 904 and the remainder of the components and devices within the environment 902. The chipset 906 can provide an interface to a random-access memory ("RAM") 908, which can be used as the main memory in the device 900 in some embodiments. The chipset 906 can further be configured to provide an interface to a computer-readable storage medium such as a read-only memory ("ROM") 910 or non-volatile RAM ("NVRAM") for storing basic routines that can help with various tasks such as, but not limited to, starting up the device 900 and/or transferring information between the various components and devices. The ROM 910 or NVRAM can also store other application components necessary for the operation of the device 900 in accordance with various embodiments described herein.

Additional embodiments of the device 900 can be configured to operate in a networked environment using logical connections to remote computing devices and computer systems through a network, such as the network 940. The chipset 906 can include functionality for providing network connectivity through a network interface card ("NIC") 912, which may comprise a gigabit Ethernet adapter or similar component. The NIC 912 can be capable of connecting the device 900 to other devices over the network 940. It is contemplated that multiple NICs 912 may be present in the device 900, connecting the device to other types of networks and remote systems.

In further embodiments, the device 900 can be connected to a storage 918 that provides non-volatile storage for data accessible by the device 900. The storage 918 can, for instance, store an operating system 920, applications 922, subscription data 928, drop rule data 930, and filtering ruleset data 932 which are described in greater detail below. The storage 918 can be connected to the environment 902 through a storage controller 914 connected to the chipset 906. In certain embodiments, the storage 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 900 can store data within the storage 918 by transforming the physical state of the physical storage units to reflect the information being stored. The specific transformation of physical state can depend on various factors. Examples of such factors can include, but are not limited to, the technology used to implement the physical storage units, whether the storage 918 is characterized as primary or secondary storage, and the like.

In many more embodiments, the device 900 can store information within the storage 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 900 can further read or access information from the storage 918 by detecting the physical states or characteristics of one or more particular locations within the physical storage units.

In addition to the storage 918 described above, the device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 900. In many examples, the operations performed by a cloud computing network, and or any components included therein, may be supported by one or more devices similar to the device 900. Stated otherwise, some or all of the operations performed by the cloud computing network, and or any components included therein, may be performed by one or more devices 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 918 can store an operating system 920 utilized to control the operation of the device 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 918 can store other system or application programs and data utilized by the device 900.

In many additional embodiments, the storage 918 or other computer-readable storage media is encoded with computer-executable instructions which, when loaded into the device 900, may transform it from a general-purpose computing system into a special-purpose computer capable of implementing the embodiments described herein. These computer-executable instructions may be stored as application 922 and transform the device 900 by specifying how the processor(s) 904 can transition between states, as described above. In some embodiments, the device 900 has access to computer-readable storage media storing computer-executable instructions which, when executed by the device 900, perform the various processes described above with regard to FIGS. 1-8. In certain embodiments, the device 900 can also include computer-readable storage media having instructions stored thereupon for performing any of the other computer-implemented operations described herein.

In still further embodiments, the device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can be configured to provide output to a display, such as a computer monitor, a flat panel display, a digital projector, a printer, or other type of output device. Those skilled in the art will recognize that the device 900 might not include all of the components shown in FIG. 9 and can include other components that are not explicitly shown in FIG. 9 or might utilize an architecture completely different than that shown in FIG. 9.

As described above, the device 900 may support a virtualization layer, such as one or more virtual resources executing on the device 900. In many examples, the virtualization layer may be supported by a hypervisor that provides one or more virtual machines running on the device 900 to perform functions described herein. The virtualization layer may generally support a virtual resource that performs at least a portion of the techniques described herein.

In many further embodiments, the device 900 may include packet filtering logic 924. The packet filtering logic 924 can be configured to perform one or more of the various steps, processes, operations, and/or other methods that are described above. Often, the packet filtering logic 924 can be a set of instructions stored within a non-volatile memory that, when executed by the processor(s)/controller(s) 904 can carry out these steps, etc. In some embodiments, the packet filtering logic 924 may be a client application that resides on a network-connected device, such as, but not limited to, a server, switch, personal or mobile computing device in a single or distributed arrangement. The packet filtering logic 924 may process a plurality of broadcast packets to determine which broadcast packets from among the plurality of broadcast packets may be allowed and which ones may be dropped. For example, the packet filtering logic 924 may utilize a filtering ruleset to determine which broadcast packets can be allowed and which ones can be dropped. In numerous embodiments, the packet filtering logic 924 may be configured to generate the filtering ruleset. The packet filtering logic 924 may evaluate a first set of broadcast packets that is dropped and a second set of broadcast packets that is allowed, based on one or more subscription topics maintained at the device 900. In numerous additional embodiments, the packet filtering logic 924 may run periodic updates or out-of-cycle updates on the filtering ruleset prior.

In many embodiments, the subscription data 928 can include various subscription topics provided by applications. For example, the subscription data 928 may include a set of criteria, policies, or filters defined by a specific application or a service connected to the device 900. For example, an application may provide a set of criteria that defines the types of broadcast packets the application is interested in receiving from the device 900. Here, the set of criteria may refer to a subscription topic. The set of criteria defined by an application can include specific device identifiers (e.g., MAC addresses), service identifiers, or other attributes (e.g., advertisement data type, advertisement content, etc.) contained within a broadcast packet.

In a number of embodiments, the drop rule data 930 may store one or more criteria or rules based on which a broadcast packet may be dropped. In a variety of embodiments, the drop rule data 930 may include one or a combination of attribute values of broadcast packets, based on which the broadcast packets may be dropped by the device 900. The drop rule data 930 may be generated based on the subscription data 928.

In some embodiments, the filtering ruleset data 932 may include those filter rules that need to be installed at APs. For example, the filtering ruleset data 932 may be periodically or non-periodically updated by the packet filtering logic 924 to accommodate changes in the subscription data 928 or the drop rule data 930.

Finally, in numerous additional embodiments, data may be processed into a format usable by a machine-learning model 926 (e.g., feature vectors), and or other pre-processing techniques. The machine-learning ("ML") model 926 may be any type of ML model, such as supervised models, reinforcement models, and/or unsupervised models. The ML model 926 may include one or more of linear regression models, logistic regression models, decision trees, Naïve Bayes models, neural networks, k-means cluster models, random forest models, and/or other types of ML models 926. The ML model 926 may be configured to predict changes in the computational capabilities of APs and accordingly recommend a need to update the filtering ruleset data 932 to comply with the changed computational capabilities of the APs.

The ML model(s) 926 can be configured to generate inferences to make predictions or draw conclusions from data. An inference can be considered the output of a process of applying a model to new data. This can occur by learning from at least the subscription data 928, the drop rule data 930, and the filtering ruleset data 932, and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 926 may be generated by human/administrator verifications or may compare predicted outcomes with actual outcomes.

Although a specific embodiment for the device 900 suitable for configuration with the augmented reality logic 924 for carrying out the various steps, processes, methods, and operations described herein is discussed with respect to FIG. 9, any of a variety of systems and/or processes may be utilized in accordance with embodiments of the disclosure. For example, the device 900 may be in a virtual environment such as a cloud-based network administration suite, or it may be distributed across a variety of network devices or switches. The elements depicted in FIG. 9 may also be interchangeable with other elements of FIGS. 1-8 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
   a processor;

a network interface controller configured to provide access to a network; and
   a memory communicatively coupled to the processor, wherein the memory comprises a packet filtering logic that is configured to:
   receive a filtering ruleset;
   install the filtering ruleset;
   periodically evaluate whether the installed filtering ruleset remains valid based on a scheduled periodic update;
   run an out-of-cycle update on the filtering ruleset prior to the scheduled periodic update based on at least one of a new subscription topic or new filter criteria being associated with a new allow rule;
   generate a new filtering ruleset based on the out-of-cycle update;
   transmit the new filtering ruleset to the network device;
   delete a previously installed filtering ruleset in response to receiving a new filtering ruleset that includes one or more new allow rules or one or more new drop rules not present in the deleted filtering ruleset;
   install the new filtering ruleset after deleting the previous filtering ruleset;
   receive a plurality of broadcast packets from one or more network devices;
   filter out one or more broadcast packets from the plurality of broadcast packets based on the filtering ruleset; and
   forward the one or more broadcast packets to a corresponding destination.

2. The device of claim 1, wherein the filtering ruleset includes at least one allow rule that when satisfied by a broadcast packet allows forwarding of the broadcast packet.

3. The device of claim 1, wherein the filtering ruleset includes at least one drop rule that when satisfied by a broadcast packet causes dropping of the broadcast packet.

4. The device of claim 1, wherein the packet filtering logic is further configured to drop at least one other broadcast packet that remains after the filtering out of the one or more broadcast packets from the plurality of broadcast packets.

5. The device of claim 1, wherein the packet filtering logic is further configured to extract at least one of: a source device identifier, a data type, and data content from the plurality of broadcast packets.

6. The device of claim 5, wherein the filtering out of the one or more broadcast packets from the plurality of broadcast packets is further based on the source device identifier extracted from the plurality of broadcast packets.

7. The device of claim 5, wherein the filtering out of the one or more broadcast packets from the plurality of broadcast packets is further based on the data type extracted from the plurality of broadcast packets.

8. The device of claim 5, wherein the filtering out of the one or more broadcast packets from the plurality of broadcast packets is further based on the data content extracted from the plurality of broadcast packets.

9. The device of claim 1, wherein the new filtering ruleset includes at least one of a new allow rule or a new drop rule.

10. A device, comprising:
   a processor;
   a network interface controller configured to provide access to a network; and
   a memory communicatively coupled to the processor, wherein the memory comprises a packet filtering logic that is configured to:

receive one or more subscription topics from one or more applications;

evaluate periodically whether previously received subscription topics remain valid in response to receipt of a new subscription topic or filter rule;

run an out-of-cycle update prior to the scheduled periodic update based on at least one of (i) a new subscription topic or (ii) new filter criteria being associated with a new allow rule;

evaluate a first set of broadcast packets and a second set of broadcast packets, wherein the first set of broadcast packets is dropped and the second set of broadcast packets is allowed based on the one or more subscription topics;

generate a new filtering ruleset based on (i) the out-of-cycle update and (ii) the evaluation of the first set of broadcast packets and the second set of broadcast packets;

delete a previously generated filtering ruleset in response to generating a new filtering ruleset that includes one or more new allow rules or one or more new drop rules not present in the deleted filtering ruleset;

install the new filtering ruleset after deleting the previous filtering ruleset; and transmit the new filtering ruleset to the network device.

11. The device of claim 10, wherein the first set of broadcast packets and the second set of broadcast packets are evaluated over a set time period.

12. The device of claim 10, wherein the packet filtering logic is further configured to:

run a periodic update on the filtering ruleset; and generate a new filtering ruleset based on the periodic update.

13. The device of claim 12, wherein the packet filtering logic is further configured to:

identify at least one new rule in the new filtering ruleset that is different from the filtering ruleset; and transmit the new filtering ruleset to the network device based on the identified at least one new rule.

14. The device of claim 12, wherein the packet filtering logic is further configured to:

identify that the new filtering ruleset is same as the filtering ruleset; and discard the new filtering ruleset based on an identification that the new filtering ruleset is same as the filtering ruleset.

15. The device of claim 10, wherein the packet filtering logic is further configured to receive at least one of a new subscription topic or a new filter criteria associated with the one or more subscription topics.

16. The device of claim 15, wherein at least one of the new subscription topic or the new filter criteria is associated with a new allow rule.

17. The device of claim 10, wherein the network device is an access point coupled to the device over the network.

18. A method for filtering broadcast packets, comprising:

receiving a filtering ruleset;

installing the filtering ruleset;

periodically evaluating whether the installed filtering ruleset remains valid in response to receiving a new subscription topic or filter rule;

running an out-of-cycle update on the filtering ruleset prior to the scheduled periodic update based on at least one of a new subscription topic or new filter criteria being associated with a new allow rule;

generating a new filtering ruleset based on the out-of-cycle update;

transmitting the new filtering ruleset to a network device;

deleting a previously installed filtering ruleset in response to receiving a new filtering ruleset that includes one or more new allow rules or one or more new drop rules not present in the deleted filtering ruleset;

installing the new filtering ruleset after deleting the previous filtering ruleset;

receiving a plurality of broadcast packets from one or more network devices;

filtering out one or more broadcast packets from the plurality of broadcast packets based on the filtering ruleset; and forwarding the one or more broadcast packets to a corresponding destination.

* * * * *